(12) United States Patent
Huang

(10) Patent No.: US 12,160,147 B2
(45) Date of Patent: Dec. 3, 2024

(54) AXIAL MAGNETIC FIELD ELECTRIC MOTOR, STATOR ASSEMBLY, AND STATOR WINDING PROCESS

(71) Applicant: ZHEJIANG PANGOOD POWER TECHNOLOGY CO., LTD., Zhejiang (CN)

(72) Inventor: Houjia Huang, Jinhua (CN)

(73) Assignee: ZHEJIANG PANGOOD POWER TECHNOLOGY CO., LTD., Jinhua (CN)

( * ) Notice: Subject to any disclaimer, the term of this patent is extended or adjusted under 35 U.S.C. 154(b) by 246 days.

(21) Appl. No.: 17/791,458

(22) PCT Filed: Aug. 12, 2020

(86) PCT No.: PCT/CN2020/108563
§ 371 (c)(1),
(2) Date: Jul. 7, 2022

(87) PCT Pub. No.: WO2021/143121
PCT Pub. Date: Jul. 22, 2021

(65) Prior Publication Data
US 2023/0051080 A1    Feb. 16, 2023

(30) Foreign Application Priority Data

Jan. 14, 2020 (CN) .......................... 202010037881.X

(51) Int. Cl.
*H02K 15/06* (2006.01)
*H02K 1/16* (2006.01)
(Continued)

(52) U.S. Cl.
CPC ............. *H02K 15/062* (2013.01); *H02K 1/16* (2013.01); *H02K 3/12* (2013.01)

(58) Field of Classification Search
CPC .. H02K 15/062; H02K 15/065; H02K 15/066; H02K 15/067; H02K 15/0478;
(Continued)

(56) References Cited

U.S. PATENT DOCUMENTS 6,573,632 B2    6/2003  Hsu
6,768,239 B1    7/2004  Kelecy et al.
(Continued)

FOREIGN PATENT DOCUMENTS

CN    104184227 A    12/2014
CN    104319971 A    1/2015
(Continued)

OTHER PUBLICATIONS

PCT International Search Report and Written Opinion, International Application No. PCT/CN2020/108563, dated Nov. 13, 2020, 10 Pages.
(Continued)

*Primary Examiner* — Michael Andrews
(74) *Attorney, Agent, or Firm* — Kilpatrick Townsend & Stockton LLP

(57) ABSTRACT

Disclosed is a stator assembly. By means of the process steps, such as unit body winding, multi-unit preparation, winding assembly and stator embedding, that are sequentially implemented, winding of a single unit body can be achieved by means of a single flat wire, winding of a stator winding can be completed merely by means of a bending process in a whole unit body structure.

9 Claims, 4 Drawing Sheets

(51) Int. Cl.
*H02K 1/18* (2006.01)
*H02K 3/12* (2006.01)

(58) Field of Classification Search
CPC ............ H02K 1/16; H02K 1/182; H02K 3/12; H02K 3/14; H02K 3/48
USPC ..................... 310/216.001, 207; 29/605, 606
See application file for complete search history.

(56) References Cited

U.S. PATENT DOCUMENTS

| | | | |
|---|---|---|---|
| 2005/0046297 A1* | 3/2005 | Chen | H02K 15/0037 310/180 |
| 2006/0232158 A1* | 10/2006 | Patterson | H02K 3/12 310/180 |
| 2010/0117481 A1 | 5/2010 | Greaves et al. | |
| 2016/0365755 A1 | 12/2016 | Long et al. | |
| 2017/0317565 A1* | 11/2017 | Hatch | H02K 15/066 |
| 2019/0341823 A1* | 11/2019 | Ramet | H02K 3/28 |

FOREIGN PATENT DOCUMENTS

| | | |
|---|---|---|
| CN | 104682585 A | 6/2015 |
| CN | 109672277 A | 4/2019 |

OTHER PUBLICATIONS

European Patent Office, Extended European Search Report Issued in Application No. 20914429.4, Jan. 10, 2024, Germany, 8 pages.

\* cited by examiner

AXIAL MAGNETIC FIELD ELECTRIC MOTOR, STATOR ASSEMBLY, AND STATOR WINDING PROCESS

The present disclosure is a 35 U.S.C 371 Patent Application of PCT Application No. PCT/CN2020/108563, filed on Aug. 12, 2020 which claims priority to Chinese patent application No. 202010037881.X, titled "AXIAL MAGNETIC FIELD ELECTRIC MOTOR, STATOR ASSEMBLY, AND STATOR WINDING PROCESS", filed on Jan. 14, 2020 with the China National Intellectual Property Administration, each of which is incorporated herein by reference in its entirety.

FIELD

The present disclosure relates to the technical field of stator mating process of axial magnetic field electric motors, in particular to a stator winding process. The present disclosure also relates to a stator assembly made by the stator winding process and an axial magnetic field electric motor to which the stator assembly is applied.

BACKGROUND

In present, during the manufacturing and assembling process of a stator of an axial magnetic field electric motor, a commonly-adopted stator winding methods are generally divided into centralized winding and distributed winding.

Specifically, regarding the centralized winding, it is common that a coil is wound on a stator tooth, the wire embedding process is simple, but large harmonics may be generated in the magnetic field of the electric motor, which reduces the performance of the electric motor. Regarding the distributed winding structure, a coil usually spans multiple stator teeth, this kind of winding structure is manufactured with a complicated wire embedding process, but harmonics of the magnetic field of the electric motor are small and the electric motor has a better performance.

Therefore, it is an important technical problem to be solved by those skilled in the art that on how to effectively reduce the difficulty of the wire embedding process of the winding, improve the operation efficiency of wire embedding of the winding and reduce the manufacturing cost of the electric motor while ensuring the performance of the electric motor.

SUMMARY

An object of the present disclosure is to provide a stator winding process, the use of which can effectively reduce the difficulty of a wire embedding process of a winding, improve the operation efficiency of wire embedding of the winding and reduce the manufacturing cost of the electric motor. Another object of the present disclosure is to provide a stator assembly made by the stator winding process and an axial magnetic field electric motor to which the stator assembly is applied.

In order to solve the above technical problem, a stator winding process is provided according to the present disclosure. The stator winding process include the following steps: winding a unit body, where a single flat wire with a certain length is wounded to form a unit body that is configured to form a single-phase winding, a connector lug with a certain length is provided at each of two free ends of the unit body, the unit body after being wound includes multiple unit layers arranged to be aligned and stacked, projections of the multiple unit layers on an section perpendicular to an axis of the unit body are coincident with each other, each of the multiple unit layers includes an outer conductor, an effective conductor and an inner conductor which are correspondingly connected from outside to inside in a radial direction of the unit layers, an outer node is formed by bending two adjacent outer conductors connected in sequence, an inner node is formed by bending two adjacent inner conductors connected in sequence, during winding, the winding is started at one end of the flat wire, the flat wire is bent in a certain angle in the same plane as long as when the flat wire passes through a position at which the outer conductor or the inner conductor and the effective conductor are connected, the flat wire is bent upward or downward as long as when the flat wire passes through the inner node or the outer node, bending directions at the outer node and the inner node which are adjacent are opposite to each other, a single layer of the flat wire can be wounded to form a unit layer until the flat wire is wound back to a starting position of winding of the flat wire, inner nodes in the same unit layer are located on the same circle, and outer nodes in the same unit layer are located on the same circle, after completion of the winding of one unit layer, the flat wire is bend downward at a last node of the unit layer, the above operations are repeated to wind a next unit layer until a unit body is formed by continuously winding the multiple unit layers, the number of layers of each unit body is consistent with the preset number of windings of a coil, and a single unit body is formed by continuously bending the single flat wire; preparing multi-units, where operations of the step of winding a unit body are repeated, to form multiple unit bodies by winding, until the number of the unit bodies meets requirements of the winding; assembling the winding, where one of the unit bodies is selected as a reference unit body, the outer node of another unit body is arranged coaxially with the reference unit body, the outer nodes of the two unit bodies are arranged to be aligned, and then the another unit body is rotated counterclockwise while the reference unit body is kept stationary, the unit layers of the another unit body are spirally advanced for one layer downward relative to the unit layers of the reference unit body as long as when the another unit body is rotated one full circle, until a last layer of the another unit body and a last layer of the reference unit body are located in the same plane, above processes are repeated to sequentially assemble the remaining unit bodies one by one to form a stator winding, and after the remaining unit bodies are all assembled, a relative angle between the connector lugs of the unit bodies is adjusted according to the preset assembly requirements of a stator assembly; and embedding a stator, where the stator winding assembled in place is embedded in embedding slots of the stator assembly, and the unit bodies are connected in series or in parallel according to the requirements of working conditions, to complete a whole assembly of the stator assembly to be completely assembled.

Preferably, in the step of winding a unit body, providing that the number of stator teeth spanning between two adjacent effective conductors is set as n, and the total number of stator teeth is set as z, then an angle between two adjacent effective conductors is set as $360°×n/z$, and a bending angle at two ends of any one of the effective conductors ranges from $90°$ to $150°$.

Preferably, in the step of preparing multi-unit, providing that the total number of the unit bodies is set as N, the total number of stator teeth is set as z, the number of phases of the stator winding is set as m, and the number of pairs of poles of an electric motor is set as p, then $N=z/(mp)$.

A stator assembly is provided according to the present disclosure. The stator assembly includes a stator casing and a stator winding, embedding slots are provided in a middle portion of the stator casing, and the stator winding is embedded in the embedding slots, where the stator assembly is made by the stator winding process as described in any one of above aspects.

An axial magnetic field electric motor is provided according to the present disclosure. The axial magnetic field electric motor includes a stator assembly and a rotor, which are arranged coaxially, where the stator assembly is the stator assembly as described in the above aspect.

Compared with the above-mentioned background technology, in the operation of the stator assembly according to the present disclosure, by means of the process steps, such as winding a unit body, preparing multi-units, assembling the winding and embedding a stator that are sequentially implemented, winding of the single unit body can be achieved by means of the single flat wire, the stator winding can be wound merely by means of a bending process in the entire unit body structure, and reliable layout and relative structure shaping among the conductors can be realized without additional processes such as welding, which greatly reduces the difficulty of the stator winding process, simplifies the process steps, improves the operation efficiency of the process, and the winding is arranged in a regular and aesthetic manner, so that the formed stator winding by winding can be integrally embedded in corresponding embedding slots of the stator casing, thereby further reducing the difficulty of wire embedding of the stator assembly, realizing efficient automatic wire embedding assembly, and reducing the process cost and the overall manufacturing cost of the electric motor.

BRIEF DESCRIPTION OF THE DRAWINGS

In order to explain more clearly the embodiments of the present disclosure or the technical solutions in the conventional technology, accompanying drawings referred to in the description of the embodiments or the conventional technology are briefly introduced. Apparently, the accompanying drawings in the following description are only some embodiments of the present disclosure. Other drawings can also be obtained for those skilled in the art according to these drawings without creative efforts.

Figure 1:
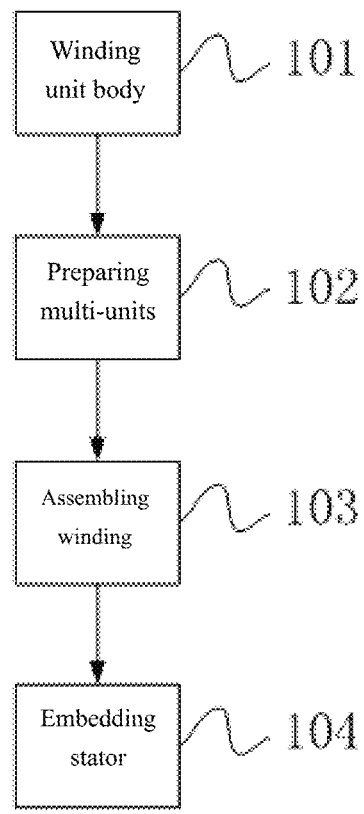
FIG. 1 is a flow chart illustrating a stator winding process according to a specific embodiment of the present disclosure.

In the drawings, reference numerals are as follows: 11—unit body, 111—connector lug, 112—unit layer, 113—outer conductor, 114—effective conductor, 115—inner conductor, 116—outer node, 117—inner node, 12—stator casing, and 121—embedding slot.

DETAILED DESCRIPTION OF THE EMBODIMENTS

The core of the present disclosure is to provide a stator assembly, the stator winding process of which can effectively reduce the difficulty of the corresponding winding and wire embedding processes, improve the operation efficiency of wire embedding of the winding and reduce the manufacturing cost of an electric motor. In addition, a stator assembly made by the above stator winding process and an axial magnetic field electric motor to which the stator assembly is applied are further provided.

In order to make those skilled in the art better understand the solution of the present disclosure, the present disclosure will be further described in detail hereinafter with reference to the accompanying drawings and specific embodiments.

Figure 2:
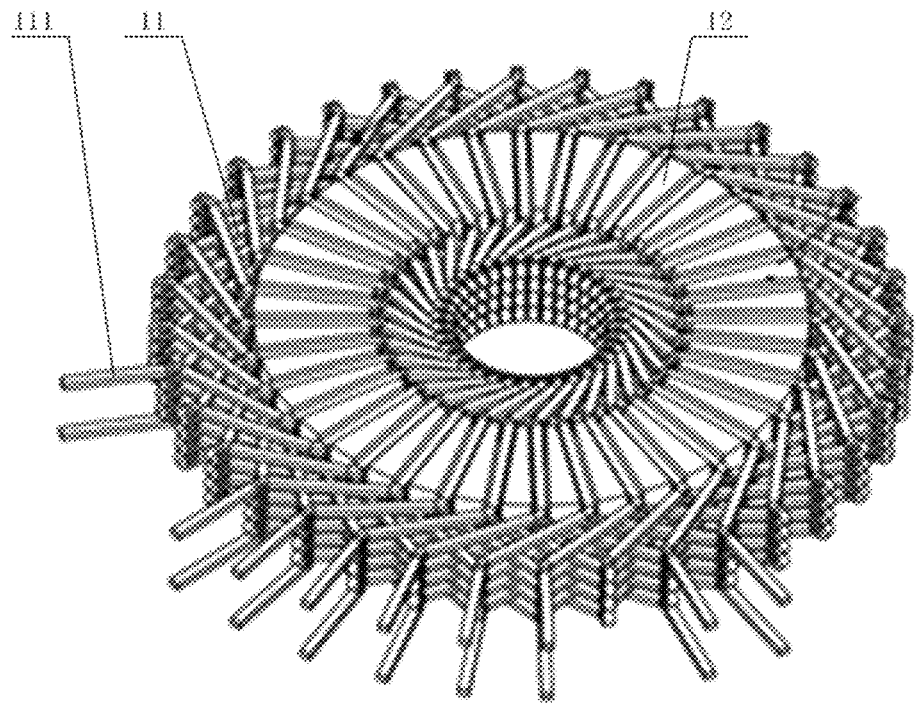
FIG. 2 is a schematic view illustrating an assembly structure of a stator assembly according to a specific embodiment of the present disclosure.
Figure 3:
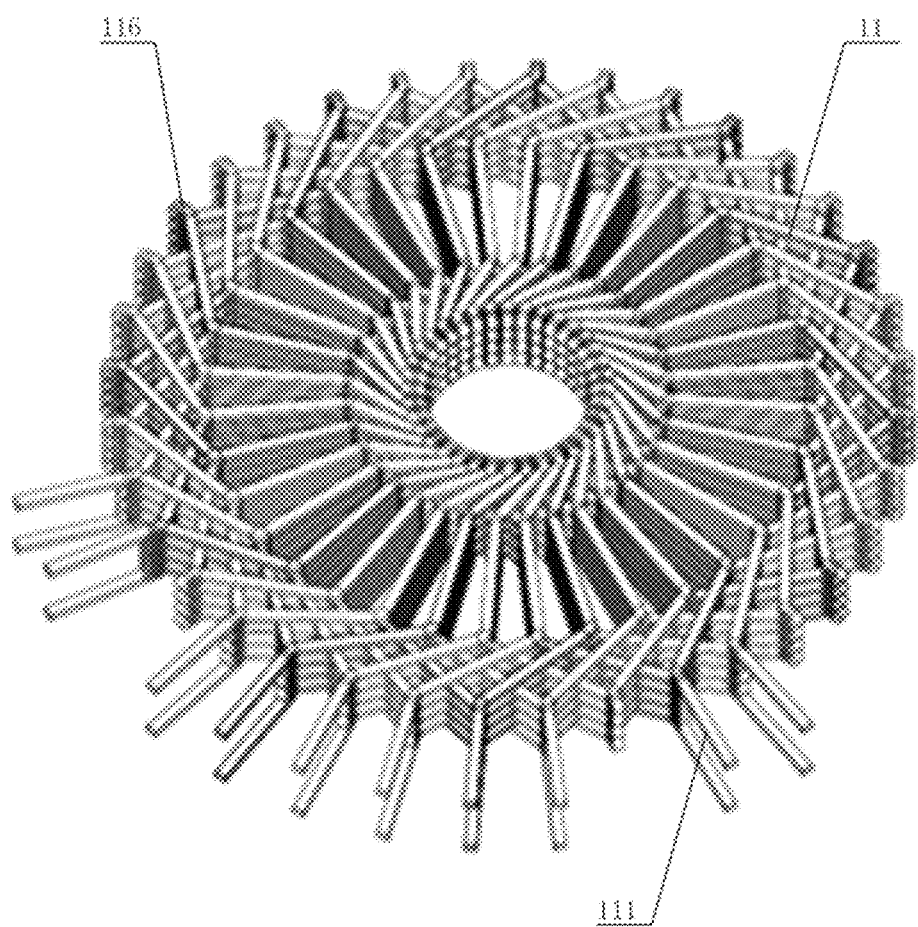
FIG. 3 is a schematic view illustrating the structure of a stator winding part in FIG. 2.
Figure 4:
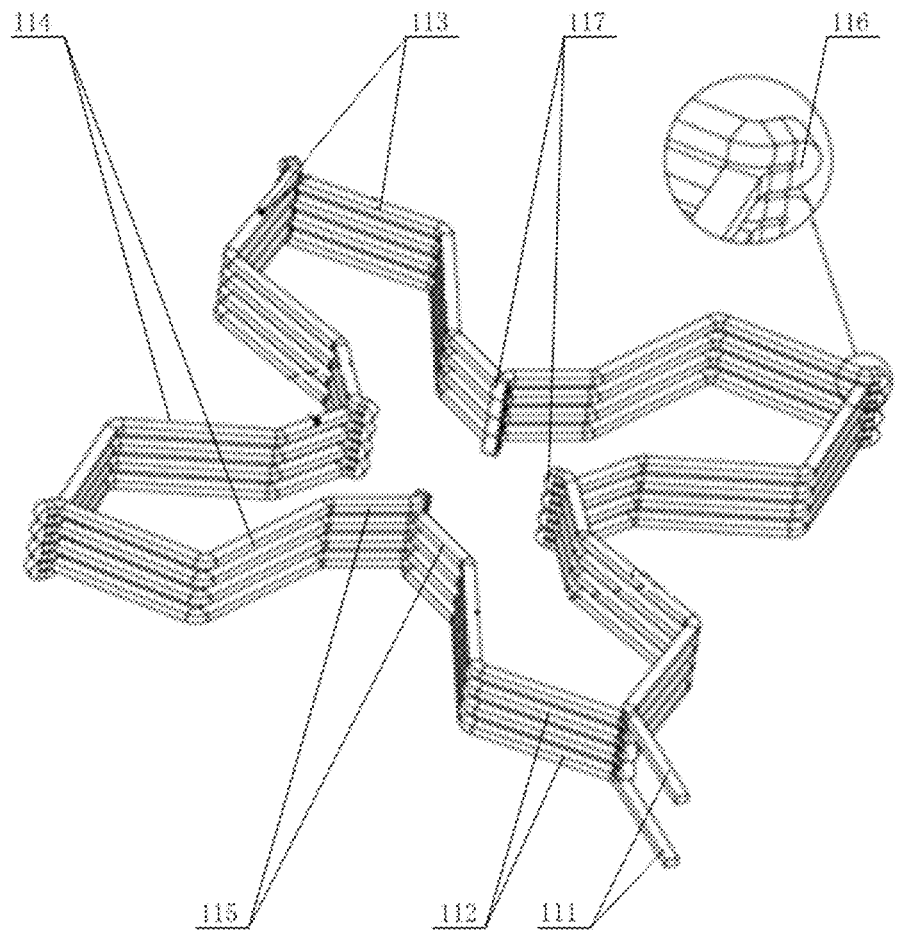
FIG. 4 is a schematic view illustrating the structure of a unit body part in FIG. 3.
Figure 5:
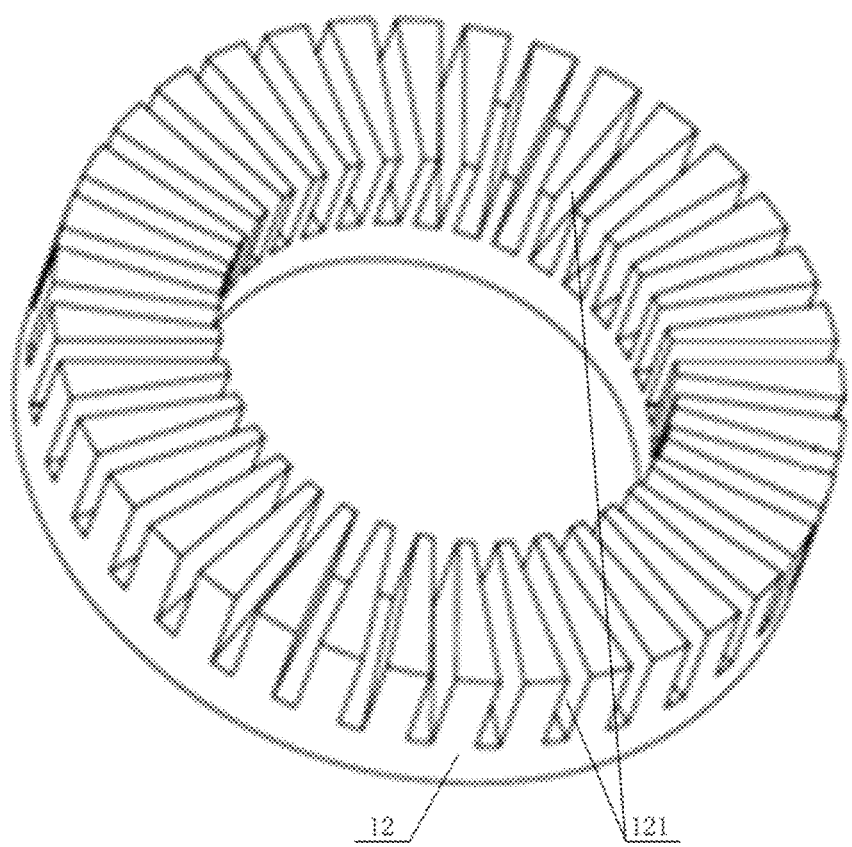
FIG. 5 is a schematic view illustrating the structure of a stator casing part in FIG. 2.

Reference is mainly made to FIG. 1 and reference is made to FIGS. 2 to 5 in conjunction. FIG. 1 is a flow chart illustrating a stator winding process according to an embodiment of the present disclosure; FIG. 2 is a schematic view illustrating an assembly structure of a stator assembly according to an specific embodiment of the present disclosure; FIG. 3 is a schematic view illustrating the structure of a stator winding part in FIG. 2; FIG. 4 is a schematic view illustrating the structure of a unit body part in FIG. 3; and FIG. 5 is a schematic view illustrating the structure of a stator casing part in FIG. 2.

In a specific embodiment, a molding process for aluminum alloy casting 21 according to the present disclosure adopts a mold for the aluminum alloy casting 21 as described above. The process includes following steps:

In step 101, winding a unit body:

A single flat wire with a certain length is wounded to form a unit body 11 that can form a single-phase winding, a connector lug 111 with a certain length is provided at each of two free ends of the unit body 11, the unit body 11 after being wound includes multiple unit layers 112 arranged in a aligned and stacked manner, projections of the multiple unit layers 112 on an section perpendicular to an axis of the unit body 11 are coincident with each other, each of the multiple the unit layers 112 includes an outer conductor 113, an effective conductor 114 and an inner conductor 115 which are correspondingly connected from outside to inside in a radial direction of the unit layers, an outer node 116 is formed by bending two adjacent outer conductors 113 connected in sequence, an inner node 117 is formed by bending two adjacent inner conductors 115 connected in sequence. During winding, the winding is started at one end of the flat wire, and the flat wire is bent in a certain angle in the same plane as long as when the flat wire passes through a position at which the outer conductor 113 or the inner conductor 115 and the effective conductor 114 are connected, the flat wire is bent upward or downward as long as when the flat wire passes through the inner node 117 or the outer node 116, and the bending directions at the outer node 116 and the inner node 117 which are adjacent are opposite to each other, and a single layer of the flat wire can be wounded to form a unit layer 112 until the flat wire is wound back to the starting position of winding of the flat wire, where the inner nodes 117 in the same unit layer 112 are located on the same circle, and the outer nodes 116 in the same unit layer 112 are located on the same circle. After the completion of winding of one unit layer 112, the flat wire is bend downward at the last node of the unit layer 112, and the same operations are repeated so as to wind a next unit layer 112 until a unit body 11 is formed by continuously winding multiple unit layers 112, the number of layers in each unit body 11 is consistent with the preset number of windings of a coil, and a single unit body 11 is formed by continuously bending the single flat wire.

It should be noted that, in a normal condition, in order to improve the electrical conductivity, the flat wire is preferably a flat copper wire, and the wire winding is in the form of a wave winding structure, so that a single coil can span multiple stator teeth, thereby effectively reducing harmonics in the magnetic field of the electric motor to ensure the performance of the electric motor.

Further, in the step 102 of winding a unit body, providing that the number of stator teeth spanning between two adjacent effective conductors 114 is set as n, and the total number of stator teeth is set as z, then an angle between two adjacent effective conductors 114 is set as $360°\times n/z$, and a bending angle at two ends of any one of the effective conductors 114 ranges from 90° to 150°. The above dimension and specification allow the structure of the stator winding to be more regular, thereby further reducing the difficulty of wire embedding, improving the assembly efficiency between the stator winding and the stator casing 12, and ensuring the overall assembly effect of the stator assembly and the overall performance of the electric motor.

In step 102, preparing multi-units:

Operations of the step of winding a unit body 11 are repeated to form multiple unit bodies 11 by winding, until the number of the unit bodies 11 meets the requirements of the winding.

More specifically, in the step 102 of preparing multi-units, providing that the total number of the unit bodies 11 is set as N, the total number of stator teeth is set as z, the number of phases of the stator winding is set as m, and the number of pairs of poles of the electric motor is set as p, then $N=z/(mp)$. It should be pointed out that the number of pairs of poles of the electric motor p mentioned above equals to half of the total number of poles of the electric motor.

In step 103, assembling the winding:

One unit body 11 is selected as a reference unit body 11, another unit body 11 is arranged coaxially with the reference unit body 11, and the outer nodes 116 of these two unit bodies 11 are arranged to be aligned, and then the another unit body 11 is rotated counterclockwise while the reference unit body 11 is kept stationary, the unit layers 112 of the another unit body 11 are spirally advanced for one layer downward relative to the unit layers 112 of the reference unit body 11 as long as when the another unit body 11 is rotated one full circle, until the last layer of the another unit body 11 and the last layer of the reference unit body 11 are located in the same plane, and then the processes are repeated so as to sequentially assemble the remaining unit bodies 11 one by one to form a stator winding, and after the remaining unit bodies 11 are all assembled, a relative angle between the connector lugs 111 of the unit bodies 11 is adjusted according to preset assembly requirements of a stator assembly.

In step 104, embedding a stator:

The stator winding assembled in place is embedded in embedding slots 121 of the stator casing 12, and the unit bodies 11 are connected in series or in parallel according to the requirements of working conditions, to complete a whole assembly of the stator assembly.

In a specific embodiment, the stator assembly according to the present disclosure includes a stator casing 12 and a stator winding, embedding slots 121 are provided in the stator casing 12, and the stator winding is correspondingly embedded in the embedding slots 121, the stator assembly is made by the stator winding process described above. The structure of the stator assembly is regular and reliable, the assembly process is simple and easy to implement, the operation efficiency of winding and wire embedding is high. In addition, the winding structure realizes a direction change and arrangement of the cable completely based on bending, and thus there is no solder joint in the wire structure and the process cost is relatively low.

In a specific embodiment, the axial magnetic field electric motor according to the present disclosure includes a stator assembly and a rotor which are arranged coaxially, and the stator assembly is the stator assembly as described above. The axial magnetic field electric motor has better performance and lower manufacturing cost.

In summary, in the operation of the stator winding process according to the present disclosure, by means of the process steps such as winding a unit body, preparing multi-units, assembling the winding, and embedding a stator that are sequentially implemented, winding of the single unit body can be achieved by means of the single flat wire. The stator winding can be wound merely by means of a bending process in the entire unit body structure, and the reliable layout and relative structure shaping among the conductors can be realized without additional processes such as welding, which greatly reduces the difficulty of the stator winding process, simplifies the process steps, improves the operation efficiency of the process, and the winding is arranged in a regular and aesthetic manner, so that the formed stator winding by winding can be integrally embedded in corresponding embedding slots of the stator casing, thereby further reducing the difficulty of wire embedding of the stator assembly, realizing efficient automatic wire embedding assembly, and reducing the process cost and the overall manufacturing cost of the electric motor.

In addition, in the stator assembly made by the above stator winding process according to the present disclosure, the structure is regular and reliable, the assembly process is simple and easy to implement, the operation efficiency of winding and wire embedding is high, the winding structure realizes a direction change and arrangement of the cable completely based on bending to, and thus there is no solder joint in the wire structure and the process cost is relatively low.

In addition, the axial magnetic field electric motor to which the above stator assembly is applied according to the present disclosure has better performance and lower manufacturing cost.

The stator winding process according to the present disclosure, the stator assembly made by the stator winding process, and the axial magnetic field electric motor to which the stator assembly is applied has been described above in detail. The principle and the embodiments of the present disclosure are illustrated herein by specific examples. The above description of examples is only intended to facilitate the understanding of the method and core idea of the present disclosure. It should be noted that, for those skilled in the art, many modifications and improvements may be made to the present application without departing from the principle of the present application, and these modifications and improvements are also deemed to fall into the protection scope of the present application defined by the claims.

The invention claimed is:

1. A stator winding process, comprising:
    winding a unit body, wherein a single flat wire with a certain length is wound to form the unit body that is configured to form a single-phase winding, a connector lug with a certain length is provided at each of two free ends of the unit body, the unit body after being wound comprises a plurality of unit layers arranged to be aligned and stacked, wherein projections of the plurality of unit layers on an section perpendicular to an axis of the unit body are coincident with each other, wherein each of the plurality of the unit layers comprises an outer conductor, an effective conductor and an inner conductor which are correspondingly connected from outside to inside in a radial direction of the plurality of unit layers, an outer node is formed by bending two adjacent outer conductors connected in sequence, an inner node is formed by bending two adjacent inner conductors connected in sequence, wherein during winding, the winding is started at one end of the flat wire, and the flat wire is bent in a certain angle in a same plane as long as when the flat wire passes through a position at which the outer conductor or the inner conductor and the effective conductor are connected, and the flat wire is bent upward or downward as long as when the flat wire passes through the inner node or the outer node, bending directions at the outer node and the inner node which are adjacent are opposite to each other, and a single layer of the flat wire is wound to form a unit layer until the flat wire is wound back to a starting position of winding of the flat wire, wherein inner nodes in a same unit layer are located on a same circle, and outer nodes in a same unit layer are located on a same circle, wherein after the completion of winding of one unit layer, the flat wire is bend downward at a last node of the unit layer, and same operations are repeated to wind a next unit layer until a unit body is formed by continuously winding the plurality of unit layers, a number of layers in each unit body is consistent with a preset number of windings of a coil, and a single unit body is formed by continuously bending the single flat wire;

preparing multi-units, wherein operations of winding the unit body are repeated to form a plurality of unit bodies by winding, until the number of the unit bodies meets requirements of the winding;

assembling the winding, wherein one of the plurality of unit bodies is selected as a reference unit body, another unit body is arranged coaxially with the reference unit body, the outer nodes of the two unit bodies are arranged to be aligned, and then the another unit body is rotated counterclockwise while the reference unit body is kept stationary, the unit layers of the another unit body are spirally advanced for one layer in a direction of the axis of the unit body towards a last layer of the reference unit body relative to the unit layers of the reference unit body when the another unit body is rotated one full circle, until a last layer of the another unit body and the last layer of the reference unit body are located in the same plane, above processes are repeated to sequentially assemble the remaining unit bodies one by one to form a stator winding, and after the remaining unit bodies are all assembled, a relative angle between the connector lugs of the unit bodies is adjusted according to preset assembly requirements of a stator assembly; and embedding a stator, wherein the stator winding assembled in place is embedded in embedding slots of the stator assembly, and the plurality of unit bodies are connected in series or in parallel according to the requirements of working conditions, to complete a whole assembly of the stator assembly.

2. The stator winding process according to claim 1, wherein winding the unit body comprises
providing that a number of stator teeth spanning between two adjacent effective conductors is set as n, and a total number of stator teeth is set as z, then an angle between two adjacent effective conductors is set as 360°×n/z, and a bending angle at two ends of any one of the effective conductors ranges from 90° to 150°.

3. The stator winding process according to claim 1, wherein preparing the multi-unit comprises:
providing that a total number of the plurality of unit bodies is set as N, a total number of stator teeth is set as z, a number of phases of the stator winding is set as m, and a number of pairs of poles of an electric motor is set as p, then N=z/(mp).

4. A stator assembly, comprising a stator casing and a stator winding, embedding slots are provided in the stator casing, and the stator winding is embedded in the embedding slots to be fixed to the stator casing so as to form the stator assembly, wherein the stator assembly is made by the stator winding process as claimed in claim 1.

5. An axial magnetic field electric motor, comprising the stator assembly of claim 4 and a rotor which are arranged coaxially.

6. The stator assembly according to claim 4, wherein winding the unit body comprises:
providing that a number of stator teeth spanning between two adjacent effective conductors is set as n, and a total number of stator teeth is set as z, then an angle between two adjacent effective conductors is set as 360°×n/z, and a bending angle at two ends of any one of the effective conductors ranges from 90° to 150°.

7. The stator assembly according to claim 4, wherein preparing the multi-unit comprises:
providing that a total number of the plurality of unit bodies is set as N, a total number of stator teeth is set as z, a number of phases of the stator winding is set as m, and a number of pairs of poles of an electric motor is set as p, then N=z/(mp).

8. The axial magnetic field electric motor according to claim 5, wherein winding the unit body comprises:
providing that a number of stator teeth spanning between two adjacent effective conductors is set as n, and a total number of stator teeth is set as z, then an angle between two adjacent effective conductors is set as 360°×n/z, and a bending angle at two ends of any one of the effective conductors ranges from 90° to 150°.

9. The axial magnetic field electric motor according to claim 5, wherein preparing the multi-unit comprises:
providing that a total number of the plurality of unit bodies is set as N, a total number of stator teeth is set as z, a number of phases of the stator winding is set as m, and a number of pairs of poles of an electric motor is set as p, then N=z/(mp).

* * * * *